US009079248B2

(12) United States Patent
Ackelid

(10) Patent No.: US 9,079,248 B2
(45) Date of Patent: Jul. 14, 2015

(54) METHOD AND APPARATUS FOR INCREASING THE RESOLUTION IN ADDITIVELY MANUFACTURED THREE-DIMENSIONAL ARTICLES

(71) Applicant: Arcam AB, Moelndal (SE)

(72) Inventor: Ulf Ackelid, Goeteborg (SE)

(73) Assignee: Arcam AB, Moelndal (SE)

( * ) Notice: Subject to any disclaimer, the term of this patent is extended or adjusted under 35 U.S.C. 154(b) by 0 days.

(21) Appl. No.: 14/349,052

(22) PCT Filed: Dec. 4, 2012

(86) PCT No.: PCT/EP2012/074383
§ 371 (c)(1),
(2) Date: Apr. 1, 2014

(87) PCT Pub. No.: WO2013/098050
PCT Pub. Date: Jul. 4, 2013

(65) Prior Publication Data
US 2014/0370323 A1    Dec. 18, 2014

Related U.S. Application Data

(60) Provisional application No. 61/580,768, filed on Dec. 28, 2011.

(51) Int. Cl.
*B23K 15/00* (2006.01)
*B22F 3/105* (2006.01)
(Continued)

(52) U.S. Cl.
CPC .............. *B22F 3/1055* (2013.01); *B22F 3/105* (2013.01); *B22F 3/1039* (2013.01); *B22F 3/24* (2013.01);
(Continued)

(58) Field of Classification Search
CPC .... B23K 15/00; B23K 15/0033; B23K 26/34; B23K 26/345; B23K 15/06; B22F 3/00; B22F 3/105; B22F 2201/00; B22F 2201/20; B22F 2202/11; B22F 3/0155; B29C 67/00; B29C 67/0051

USPC ............ 219/121.13, 121.14, 121.16, 121.17, 219/121.35, 121.63–121.66, 121.33; 419/30, 31, 53–55, 47; 264/485, 497; 156/62.2

See application file for complete search history.

(56) References Cited

U.S. PATENT DOCUMENTS 3,882,477 A    5/1975  Mueller
4,401,719 A    8/1983  Kobayashi et al.
(Continued)

FOREIGN PATENT DOCUMENTS

DE    19952998 A1    5/2001
DE    20305843 U1    7/2003
(Continued)

OTHER PUBLICATIONS

International Searching Authority, International Search Report for International Application No. PCT/EP2012/058733, Mar. 5, 2013, 4 pages, European Patent Office, The Netherlands.
(Continued)

*Primary Examiner* — Samuel M Heinrich
(74) *Attorney, Agent, or Firm* — Alston & Bird LLP

(57) ABSTRACT

A method for increasing the resolution when forming a three-dimensional article through successive fusion of parts of a powder bed, said method comprising providing a vacuum chamber, providing an electron gun, providing a first powder layer on a work table inside said vacuum chamber, directing an electron beam from said electron gun over said work table causing the powder layer to fuse in selected locations to form a first cross section of said three-dimensional article, providing a second powder layer on said work table, directing the electron beam over said work table causing said second powder layer to fuse in selected locations to form a second cross section of said three-dimensional article, reducing the pressure in the vacuum chamber from a first pressure level to a second pressure level between the providing of said first powder layer and said second powder layer.

12 Claims, 4 Drawing Sheets

(51) Int. Cl.
    *B29C 67/00*   (2006.01)
    *B23K 26/34*   (2014.01)
    *B22F 3/10*    (2006.01)
    *B22F 3/24*    (2006.01)

(52) U.S. Cl.
    CPC ............. *B23K 15/00* (2013.01); *B23K 26/345* (2013.01); *B29C 67/00* (2013.01); *B29C 67/0051* (2013.01); *B29C 67/0077* (2013.01); *B22F 2201/10* (2013.01); *B22F 2201/11* (2013.01); *B22F 2201/12* (2013.01); *B22F 2201/20* (2013.01); *B22F 2999/00* (2013.01); *Y10T 428/12028* (2015.01)

(56) References Cited

U.S. PATENT DOCUMENTS

| | | |
|---|---|---|
| 4,818,562 A | 4/1989 | Arcella et al. |
| 4,863,538 A | 9/1989 | Deckard |
| 4,927,992 A * | 5/1990 | Whitlow et al. ......... 219/121.65 |
| 5,182,170 A | 1/1993 | Marcus et al. |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,419,203 B1 | 7/2002 | Dang |
| 6,554,600 B1 | 4/2003 | Hofmann et al. |
| 6,583,379 B1 | 6/2003 | Meiners et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 * | 2/2006 | Dirscherl ...................... 29/527.2 |
| 7,165,498 B2 | 1/2007 | Mackrill et al. |
| 7,204,684 B2 | 4/2007 | Ederer et al. |
| 7,540,738 B2 | 6/2009 | Larsson et al. |
| 7,686,605 B2 | 3/2010 | Perret et al. |
| 7,696,501 B2 | 4/2010 | Jones |
| 7,713,454 B2 * | 5/2010 | Larsson ........................ 264/40.6 |
| 7,799,253 B2 | 9/2010 | Höchsmann et al. |
| 7,871,551 B2 | 1/2011 | Wallgren et al. |
| 8,083,513 B2 | 12/2011 | Montero-Escuder et al. |
| 2002/0104973 A1 | 8/2002 | Kerekes |
| 2003/0133822 A1 | 7/2003 | Harryson |
| 2004/0084814 A1 | 5/2004 | Boyd et al. |
| 2004/0104499 A1 | 6/2004 | Keller |
| 2004/0173946 A1 | 9/2004 | Pfeifer et al. |
| 2005/0186538 A1 | 8/2005 | Uckelmann |
| 2006/0108712 A1 | 5/2006 | Mattes |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2007/0175875 A1 * | 8/2007 | Uckelmann et al. ..... 219/121.85 |
| 2007/0182289 A1 | 8/2007 | Kigawa et al. |
| 2007/0298182 A1 | 12/2007 | Perret et al. |
| 2009/0017219 A1 | 1/2009 | Paasche et al. |
| 2009/0152771 A1 | 6/2009 | Philippi et al. |
| 2011/0133367 A1 | 6/2011 | Weidinger et al. |
| 2011/0316178 A1 | 12/2011 | Uckelmann |
| 2014/0367367 A1 * | 12/2014 | Wood et al. ................ 219/76.12 |

FOREIGN PATENT DOCUMENTS

| | | |
|---|---|---|
| DE | 102005014483 A1 | 10/2006 |
| DE | 202008005417 U1 | 8/2008 |
| DE | 102007018601 A1 | 10/2008 |
| DE | 102008012064 A1 | 9/2009 |
| EP | 0289116 A1 | 11/1988 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1952932 A2 | 8/2008 |
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 A1 | 5/1993 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098135 A1 | 7/2013 |
| WO | WO 2013/159811 A1 | 10/2013 |
| WO | WO 2013/167194 A1 | 11/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

European Search Report dated Feb. 16, 2012, for corresponding Application No. EP07852089.7.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, mailed Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.

International Preliminary Report on Patentability, dated Nov. 27, 2009, of corresponding international application No. PCT/SE2007/001084.

International Search Report dated Apr. 9, 2010 for Application No. PCT/SE2009/050901.

International Search Report dated Sep. 17, 2008 for Application No. PCT/SE2008/000007.

International Search Report mailed Sep. 2, 2008 of corresponding international application No. PCT/SE2007/001084.

International Searching Authority (ISA), International Search Report and Written Opinion for International Application No. PCT/EP2012/076025, mailed May 17, 2013, 11 pages, European Patent Office, The Netherlands.

International Searching Authority, International Search Report for International Application No. PCT/SE2011/050093, mailed Oct. 20, 2011, 5 pages, The Swedish Patent and Registration Office, Sweden.

(56) References Cited

OTHER PUBLICATIONS

International Searching Authority, International Search Report for International Application No. PCT/EP2012/057470, mailed Jan. 24, 2013, 1 page, European Patent Office, The Netherlands.
Office Action dated Feb. 14, 2012 for U.S. Appl. No. 12/745,081.
Office Action dated Nov. 8, 2011, U.S. Appl. No. 12/745,081.
United States Patent and Trademark Office, Final Office Action for U.S. Appl. No. 12/745,081, dated Jun. 21, 2012, 6 pages, USA.
United States Patent and Trademark Office, Notice of Allowance and Fee(s) Due for U.S. Appl. No. 13/144,451, mailed Sep. 25, 2012, 16 pages, USA.
United States Patent and Trademark Office, Office Action for U.S. Appl. No. 12/810,602, mailed Sep. 10, 2012, 13 pages, USA.
United States Patent and Trademark Office, Office Action for U.S. Appl. No. 12/810,602, Dec. 20, 2012, 8 pages, USA.

Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., "The Design of Scaffolds for Use in Tissue Engineering, Part II, Rapid Prototyping Techniques", Tissue Engineering, 2002, pp. 1-11, vol. 8, No. 1, XP002691484.
International Searching Authority, International Search Report and Written Opinion for International Application No. PCT/EP2012/074383, mailed Feb. 27, 2013, 10 pages, European Patent Office, The Netherlands.
International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

\* cited by examiner

METHOD AND APPARATUS FOR INCREASING THE RESOLUTION IN ADDITIVELY MANUFACTURED THREE-DIMENSIONAL ARTICLES

CROSS REFERENCE TO RELATED APPLICATIONS

This application is a national stage application, filed under 35 U.S.C. §371, of International Application No. PCT/EP2012/074383, filed Dec. 4, 2012, which claims priority to U.S. Provisional Application No. 61/580,768, filed Dec. 28, 2011, the contents of both which are hereby incorporated by reference in their entirety.

BACKGROUND

1. Related Field

The present invention relates to a method for increasing the resolution in additively manufactured three-dimensional articles according to the preamble of claim 1.

2. Description of Related Art

Freeform fabrication or additive manufacturing is a method for forming three-dimensional articles through successive fusion of chosen parts of powder layers applied to a worktable.

Such an apparatus may comprise a work table on which said three-dimensional article is to be formed, a powder dispenser, arranged to lay down a thin layer of powder on the work table for the formation of a powder bed, an energy beam for delivering energy to the powder whereby fusion of the powder takes place, elements for control of the energy given off by the energy beam over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

When an energy beam in the form of an electron beam hits the powder, a charge distribution develops around the electron target area. Desirably, this charge will be led through a produced part of the article to be made and/or the powder bed towards ground. If the charge distribution density exceeds a critical limit, an electrical field having field strength above a predetermined level will develop around the position where the beam is radiating. The electrical field having electrical field strength above the predetermined level will be referred to as $E_{max}$. An electrical field will cause the powder particles to repel each other such that particles leave the uppermost surface layer of the particle and create a distribution of particles floating above the surface. The floating particles resemble a cloud positioned above the surface. When the electrical field has field strength above $E_{max}$, the electrical field, i.e. the particle cloud or smoke of powder, will influence the resolution of the device in a negative way. This is partly due to the fact that the particles in the particle cloud will diverge the electron beam. When the electrical field has field strength below $E_{max}$, the electrical field, i.e. the particle cloud, will not influence the resolution of the device in a significant way. A field strength below $E_{max}$ is thus desirable.

Since the particles are charged they will seek a ground contact and thereby some may leave the cloud and will then contaminate different parts of the device being positioned inside the vacuum chamber. A result of such a critical electrical field is that the structure of the powder surface will be destroyed.

One solution to the problem of avoiding charging of powder is disclosed in WO 2008/147306. In said document the amount of ions present in close vicinity to the position where the electron beam radiates the powder material is controlled. This is according to one example embodiment performed by introducing a supplementary gas into the vacuum chamber, which is capable of producing ions when irradiated by the electron beam.

The problem with said solution is that the supplementary gas increases the electron beam spot dimension and thereby affects the resolution of the additive manufacturing process in a negative way.

BRIEF SUMMARY

An object of the invention is to provide a method and apparatus for increasing the resolution in the additive manufacturing process while maintaining the electrical field distribution in the powder material so that free floating particles is prohibited.

The abovementioned object is achieved by the features in the method according to claim 1.

In a first aspect of the invention it is provided a method for increasing the resolution when forming a three-dimensional article through successive fusion of parts of a powder bed, which parts corresponds to successive cross sections of the three-dimensional article. Said method comprising the steps of: providing a vacuum chamber, providing an electron gun, providing a first powder layer on a work table inside said vacuum chamber, directing an electron beam from said electron gun over said work table causing said first powder layer to fuse in selected locations to form a first cross section of said three-dimensional article, providing a second powder layer on said work table, directing the electron beam over said work table causing said second powder layer to fuse in selected locations to form a second cross section of said three-dimensional article, wherein said second layer is bonded to said first layer, reducing the pressure in the vacuum chamber from a first pressure level to a second pressure level between the steps of providing said first powder layer and said second powder layer.

An advantage of the present invention is that the pressure level and/or the amount of ions in the vacuum chamber can be adapted to the process step, i.e., by providing a relatively high first pressure level during a preheating step when smoke of powder is most likely and thereafter decreasing the pressure to a relatively low second pressure level. By so doing, the preheating step is performed at the first pressure level where the number of ions present is high enough in order to prohibit smoke of powder. Since the preheating can be performed with any kind of energy beam quality, the spread of the energy beam due to the interaction of the electron beam with the gas atoms will not affect the quality of the final three dimensional article. The actual fusing of said powder is performed at the second pressure level, which is considerably smaller than said first pressure level, so that the electron beam resolution can be as high as possible. The number of gas atoms in the vacuum chamber during the fusion step is much smaller than during the preheating step. Since the powder is already sintered, particle smoke is not an issue. A decreased pressure level during the fusion step will affect the quality of the electron beam, i.e., the lower the pressure level the better the beam quality. This in turn will increase the resolution of the final three dimensional article to be produced.

Another advantage of the present invention is that a lifetime of a filament of an electron beam source can be prolonged since a mean pressure during the additive manufacturing process may be decreased compared to the state of the art technique. In an example embodiment the relatively high first pressure level may only be present during less than 20% of the total process time of each layer. The reminder of the process time for each layer the second pressure level is present, which is considerably lower than the first pressure level. In an example embodiment said second pressure level may be present during more than 80% of the process time of each layer. The relatively high first pressure level may only be present in a first part of a preheating step. The second pressure level, being considerably lower than said first pressure level may be present during the complete fusion step and a second part of the preheating step and any other process step for each layer.

In one example embodiment of the present invention said method further comprising the step of providing a first supplementary gas into the vacuum chamber, which first supplementary gas is capable of providing ions when irradiated by the electron beam during said preheating.

An advantage of said embodiment is that one can provide an amount of gas not more than necessary for suppressing the smoke of powder.

In still another example embodiment of the present invention said first supplementary gas is at least one inert gas, wherein said inert gas is one or more in the group of: Helium, Argon, Carbon dioxide, Nitrogen, Neon, Krypton, Xenon, Radon.

An advantage of the present invention is that other gases may be used in the vacuum chamber. Usually gases with light atoms, for instance helium, were used since gases with heavier atoms scattered the electron beam too much resulting in bad resolution. A decrease of pressure from the preheating step to the fusion step makes it possible to use gases with heavier atoms while maintaining the resolution of the electron beam. Argon, which has heavier atoms compared to Helium, is a better gas for prohibiting smoke of powder. Since the quality of the beam during preheating is not important Argon or any one of or combinations of Carbon dioxide, Nitrogen, Neon, Krypton, Xenon, Radon may be used to prohibit powder smoke during preheating. If the pressure during fusion is decreased sufficiently the electron beam quality will not be degraded as would have been the case if the pressure would have been the same during preheating and fusion.

In yet another example embodiment of the present invention said method further comprising the step of providing a second supplementary gas into the vacuum chamber, which second supplementary gas is capable of, at least when having been exposed to the electron beam, reacting chemically and/or physically with the powder layer on the work table.

Since the pressure in the vacuum chamber has been decreased during the fusion step to at around $10^{-5}$ mbar or lower, a second supplementary gas may be provided into the chamber during the fusion step. Said second supplementary gas may influence the characteristic of the final article by for example increasing its strength, ductility or any other mechanical property.

In still another example embodiment of the present invention said second supplementary gas is one or more selected from the group of: Hydrogen, deuterium, hydrocarbons, gaseous organic compounds, ammonia, nitrogen, oxygen, carbon monoxide, carbon dioxide, nitrogen oxides and/or nitrous oxide.

BRIEF DESCRIPTION OF THE FIGURES

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 2:
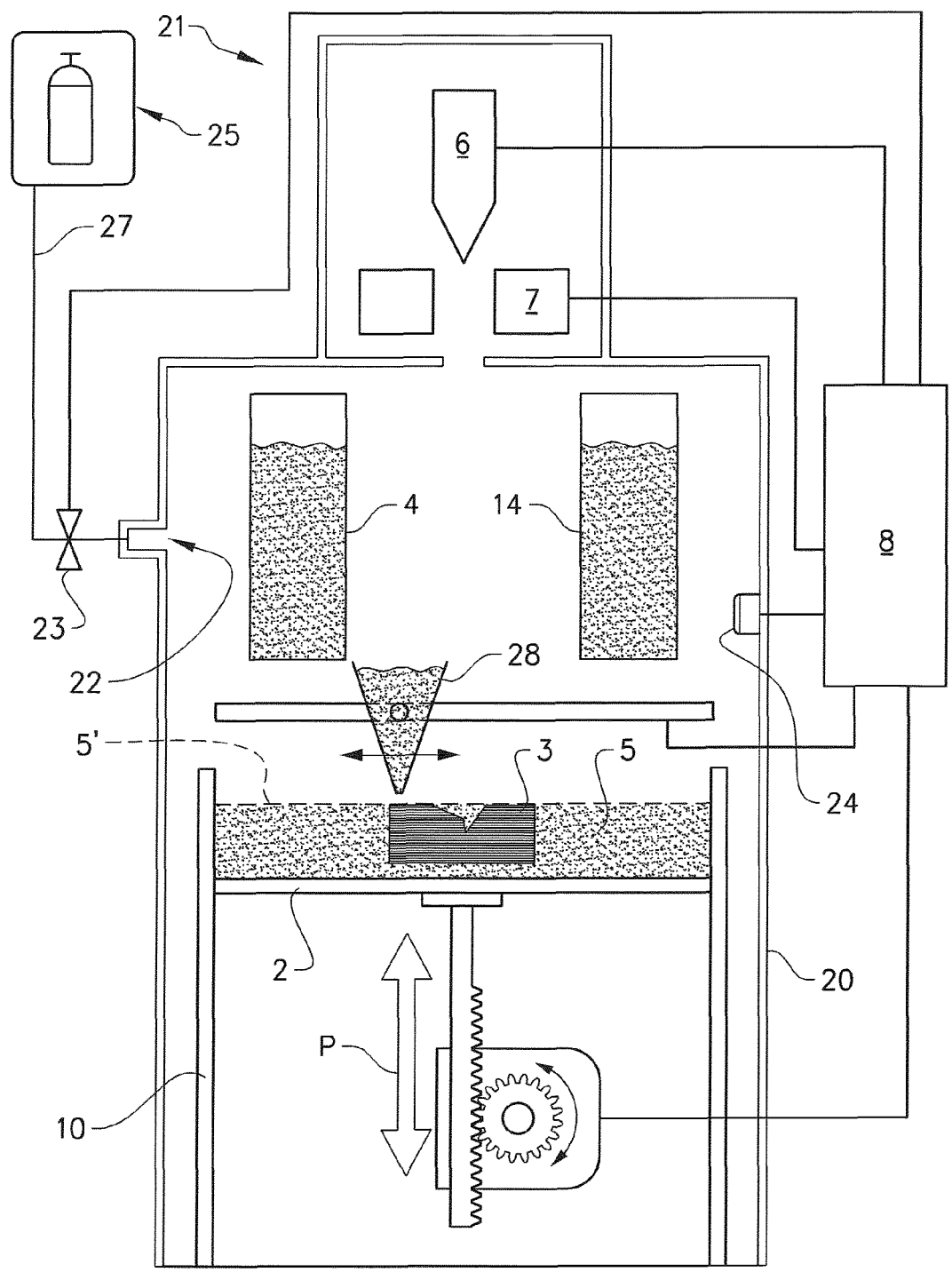
FIG. 2 shows, in a schematic view, an example embodiment of a device for producing a three dimensional product in which device a first and second embodiment of the inventive method can be applied.

FIG. 2 depicts an embodiment of a freeform fabrication or additive manufacturing apparatus 21 in which the inventive method according to the present invention may be implemented.

Said apparatus 21 comprising an electron beam gun 6; deflection coils 7; two powder hoppers 4, 14; a build platform 2; a build tank 10; a powder distributor 28; a powder bed 5; and a vacuum chamber 20.

The vacuum chamber 20 is capable of maintaining a vacuum environment by means of a vacuum system, which system may comprise a turbomolecular pump, a scroll pump, an ion pump and one or more valves which are well known to a skilled person in the art and therefore need no further explanation in this context. The vacuum system is controlled by a control unit 8.

The electron beam gun 6 is generating an electron beam which is used for melting or fusing together powder material provided on the build platform 2. At least a portion of the electron beam gun 6 may be provided in the vacuum chamber 20. The control unit 8 may be used for controlling and managing the electron beam emitted from the electron beam gun 6. At least one focusing coil (not shown), at least one deflection coil 7, an optional coil for astigmatic correction (not shown) and an electron beam power supply (not shown) may be electrically connected to said control unit 8. In an example embodiment of the invention said electron beam gun 6 generates a focusable electron beam with an accelerating voltage of about 15-60 kV and with a beam power in the range of 3-10 Kw. The pressure in the vacuum chamber may be $10^{-3}$ mbar or lower when building the three-dimensional article by fusing the powder layer by layer with the energy beam.

The powder hoppers 4, 14 comprise the powder material to be provided on the build platform 2 in the build tank 10. The powder material may for instance be pure metals or metal alloys such as titanium, titanium alloys, aluminum, aluminum alloys, stainless steel, Co—Cr alloys, nickel based superalloys etc.

The powder distributor 28 is arranged to lay down a thin layer of the powder material on the build platform 2. During a work cycle the build platform 2 will be lowered successively in relation to a fixed point in the vacuum chamber. In order to make this movement possible, the build platform 2 is in one embodiment of the invention arranged movably in vertical direction, i.e., in the direction indicated by arrow P. This means that the build platform 2 starts in an initial position, in which a first powder material layer of necessary thickness has been laid down. Means for lowering the build platform 2 may for instance be through a servo engine equipped with a gear, adjusting screws etc.

An electron beam may be directed over said build platform 2 causing said first powder layer to fuse in selected locations to form a first cross section of said three-dimensional article. The beam is directed over said build platform 2 from instructions given by the control unit 8. In the control unit 8 instructions for how to control the electron beam for each layer of the three-dimensional article is stored.

After a first layer is finished, i.e., the fusion of powder material for making a first layer of the three-dimensional article, a second powder layer is provided on said build platform 2. The second powder layer is preferably distributed according to the same manner as the previous layer. However, there might be alternative methods in the same additive manufacturing machine for distributing powder onto the work table. For instance, a first layer may be provided by means of a first powder distributor 28, a second layer may be provided by another powder distributor. The design of the powder distributor is automatically changed according to instructions from the control unit 8. A powder distributor 28 in the form of a single rake system, i.e., where one rake is catching powder fallen down from both a left powder hopper 4 and a right powder hopper 14, the rake as such can change design.

After having distributed the second powder layer on the build platform, the energy beam is directed over said work table causing said second powder layer to fuse in selected locations to form a second cross section of said three-dimensional article. Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

In the case where an electron beam is used, it is necessary to consider the charge distribution that is created in the powder as the electrons hit the powder bed 5. The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with predetermined values of the beam current and beam scanning velocity.

A general function for describing the charge density that develops in the powder in an arbitrary scanning procedure will be a rather complex function of time and beam position since the charge density generated along one scanned path will be affected by the charge density generated along another scanned path if these paths are not very well separated in space and time. Thus, charge summation effects between different paths must be taken into account.

Figure 4:
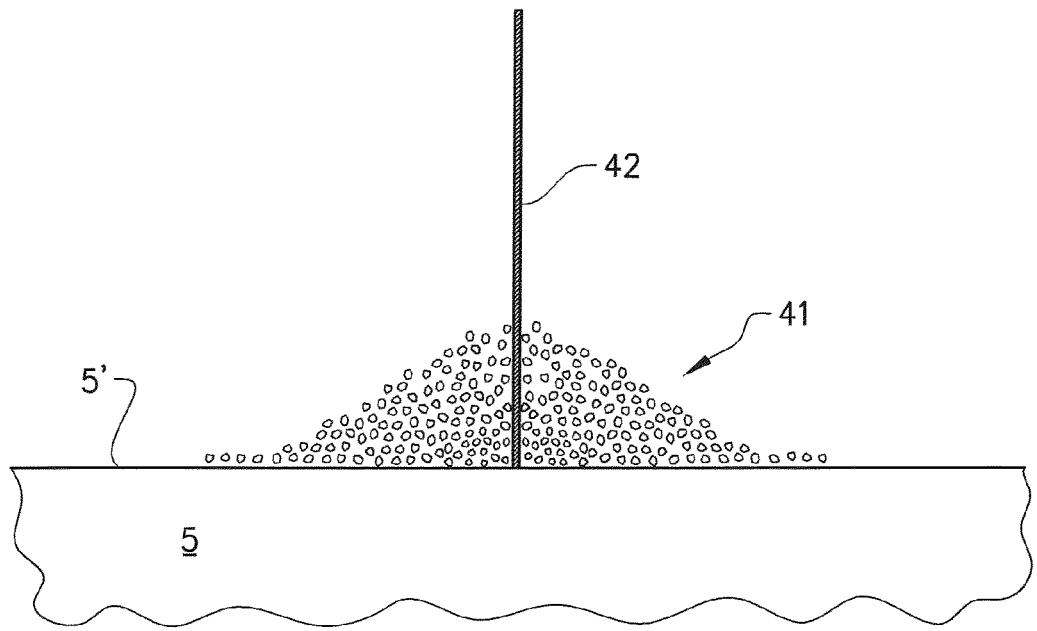
FIG. 4 depicts, in schematic view, an example of the surface of the powdery material with a charged particle cloud.

FIG. 4 shows the upper layer 5' of the powder bed 5 of the powdery material with a charged particle cloud 41. The cloud is concentrated around the position where the electron beam 42 radiates the powdery material. With a higher electrical field, a larger cloud will occur around the radiating point. The number of ions introduced into the vacuum chamber or created in the vacuum chamber should thus be above a predefined level in order to neutralize enough charges in the surface of the powder. The predefined level should be selected such that it keeps the electrical field strength below $E_{max}$. In doing so, enough of the powdery material is neutralized and lifting of powder is prohibited.

Figure 1:
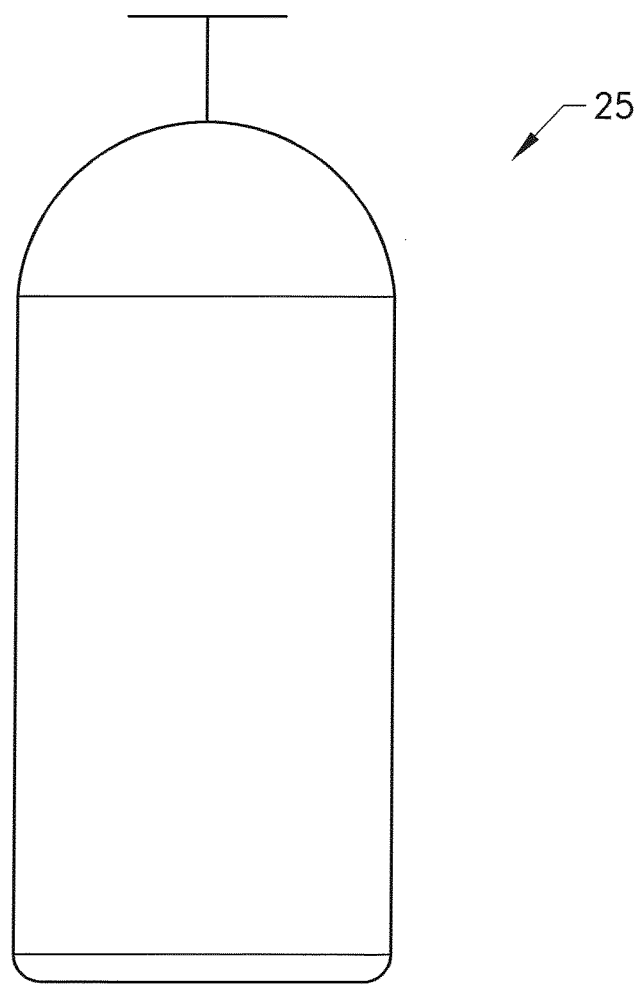
FIG. 1 depicts a first example embodiment of how the method according to the present invention may be implemented.

FIG. 1 depicts a first example embodiment of how the method according to the present invention may be implemented. FIG. 1 depicts a gas pressure source in the form of a gas bottle 25. The gas bottle 25 is connectable to the additive manufacturing apparatus 21 via a pipe 27 and a valve 23. The valve is in this embodiment controlled by the control unit 8. When the valve is open gas from the gas source 25 will be provided into the additive manufacturing device 21 through an inlet 22. The valve may be set to any position between fully open and fully closed, i.e., the gas flow may be regulated by the valve 23. In an alternative embodiment a pressure and flow regulator may be provided directly on the gas source 25, leaving the only functionality of the valve 23 to be the opening and closing means for the gas into the additive manufacturing apparatus 21.

Figure 3:
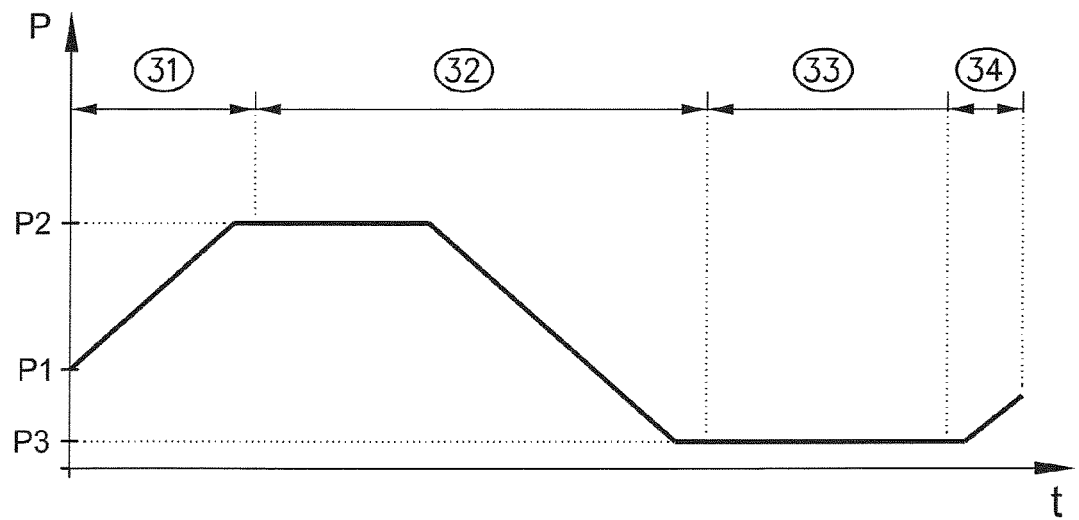
FIG. 3 depicts a pressure versus time graph of the first example embodiment according to the present invention

FIG. 3 depicts a pressure versus time graph of the first example embodiment according to FIG. 1 of the present invention. In FIG. 3, four different process steps, denoted 31, 32, 33 and 34 respectively, are marked above the pressure graph. Powder distribution is the first process step denoted by 31 in FIG. 3. During the powder distribution 31, i.e., providing powder on the build platform 2 (clean build platform or a build platform provided with one or several cross sections of fused material), the pressure inside the additive manufacturing apparatus 21 may be increased from an initial pressure level P1 when the powder distribution is started to a first pressure level P2 when the powder distribution is finalized.

A next process step is the preheating step 32. During preheating the powder provided on the build platform 2 is about to be brought to an appropriate temperature before a fusing step 33. This preheating step is performed by scanning the electron beam over the powder bed in an appropriate manner for heating the powder bed without creating powder smoke. This is performed by leaving enough spacing between two consecutive scanning lines so the summation of charges in a first scanning line is not affecting the charges provided in the second scanning line. During preheating the pressure in the additive manufacturing apparatus 21 is at a first pressure level P2, which is high enough for suppressing or eliminating smoke of powder. The first pressure level P2 may be around $10^{-3}$ mbar. The pressure level may be at a constant high level throughout the preheating. Alternatively the pressure level is varying during said preheating but always high enough in order to suppress smoke of powder. In FIG. 3, the pressure is at a high level, the first pressure level P2, in the first part of the preheating. In a second part of the preheating the pressure is decreased at a constant rate to the second pressure level P3, where the second pressure level P3 is lower than the first pressure level P2 and the initial pressure level P1. Smoke of powder is most likely to be present in the beginning of the preheating when no powder is sintered at all. The more the powder is sintered the less is the likelihood of creating smoke of powder. One can therefore start to decrease the pressure during the preheating step after some time which is illustrated in FIG. 3.

During a fusion step 33 the pressure in the additive manufacturing apparatus 21 may be kept as low as possible and in FIG. 3 it is kept at the second pressure level P3, which may be about $10^{-5}$ mbar or lower.

In the inventive method it is provided a reduction of the pressure in the vacuum chamber of said additive manufacturing apparatus from a first pressure level, here indicated by said first pressure level P2, to a second pressure level, here indicated by P3, between the steps of providing said first powder layer and said second powder layer.

The preheating of the powder bed may be performed at least partially with said first pressure level P2 which is higher than said second pressure level P3. Said powder bed may be fused in said selected locations at least partially with said second pressure level P3.

When the fusion step is finalized the powder and fused powder may need some heating in order to be within a predetermined temperature interval. This heating step is denoted in FIG. 3 by 34. The preheating temperature is material dependent which means that different materials require different preheating temperature intervals. The temperature chosen for said preheating may affect the internal stresses and fatigue properties of the final three dimensional article. When the heating is finalized or when no heating is needed, the process starts all over again by providing the next powder layer. The pressure in the additive manufacturing apparatus may start to be increased already during the heating step in order to be able to reach the necessary pressure during the preheating step 32.

Figure 5:
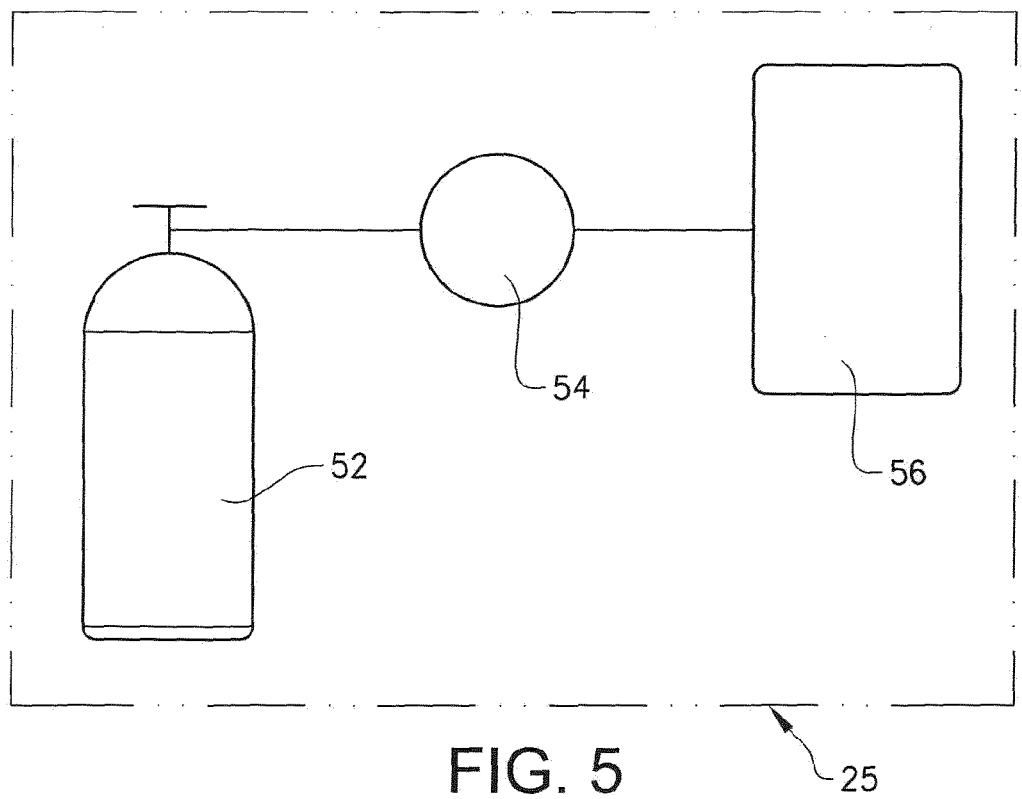
FIG. 5 depicts a second example embodiment of how the method according to the present invention may be implemented.

FIG. 5 depicts a second example embodiment of how the method according to the present invention may be implemented. FIG. 5 depicts a gas pressure source in the form of a gas bottle 52, a second valve 54 and a reservoir 56. The reservoir 56 is connectable to the additive manufacturing apparatus 21 via a pipe 27 and a valve 23. The valve 23 and the second valve 54 are in this embodiment controlled by the control unit 8. Valve 23 and 54 may be on-off valves.

When the second valve 54 is open said valve 23 is closed. With the second valve 54 open and the valve 23 closed gas from the gas source 52 will be provided into the reservoir 56. The pressure and time said second valve is open will determine the amount of gas provided to the reservoir given a constant volume of the reservoir 56. In an example embodiment said time said valve 54 is opened may be 1 second.

When the second valve 54 is closed said valve 23 may be opened in order to let the gas from the reservoir into the additive manufacturing device 21. In an example embodiment said time said valve 23 is opened may be 1 second.

The embodiment in FIG. 3 is operated by opening and closing said valve 23 and the second valve 54. Both valves 23, 54 may be closed at the same time. When one valve 23, 54 is open the other valve 23, 54 is closed. Both valves 23, 54 may not be opened at the same time, in this case at least one of the valves needs to be controlled in the way the valve is controlled in FIG. 1, which means that the second valve 54 and the reservoir 56 will be superfluous.

Figure 6:
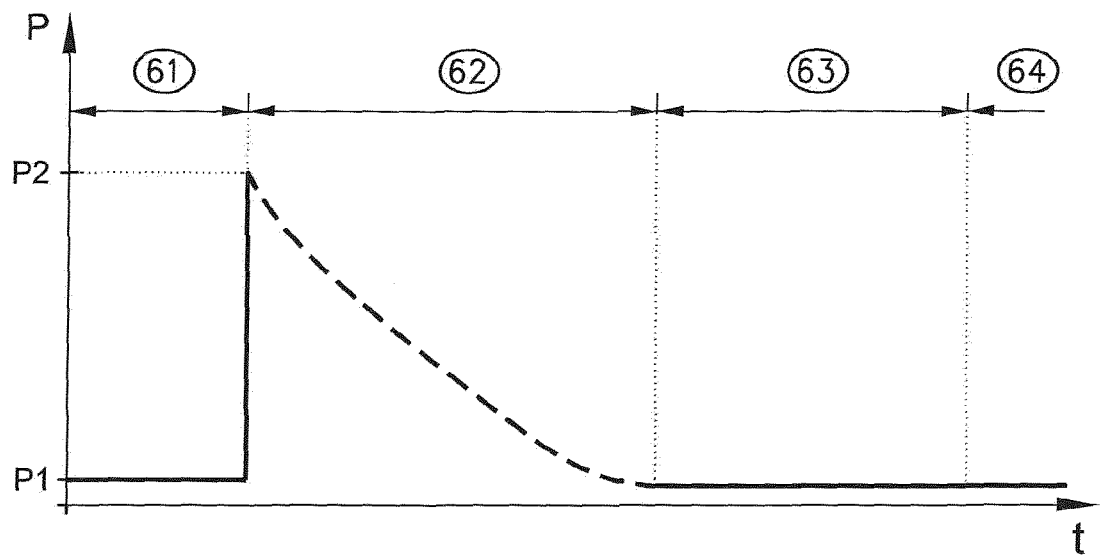
FIG. 6 depicts a pressure versus time graph of the second example embodiment according to the present invention.

FIG. 6 depicts a pressure versus time graph of the second example embodiment according to the present invention. In FIG. 6, four different process steps, denoted 61, 62, 63 and 64 respectively, are marked above the pressure graph. Powder distribution is the first process step denoted by 61 in FIG. 3. During the powder distribution 61, i.e., providing powder on the build platform 2 (clean build platform or a build platform provided with one or several cross sections of fused material), the pressure inside the additive manufacturing apparatus 21 may be at a second pressure level P1.

A next process step is the preheating step 62. During preheating the powder provided on the build platform 2 is about to be brought to an appropriate temperature before a fusing step 63. This preheating step is performed by scanning the electron beam over the powder bed in an appropriate manner for heating the powder bed without creating powder smoke as described in connection with FIG. 3. During preheating the pressure in the additive manufacturing apparatus 21 is initially at the first pressure level P2, which is high enough for suppressing smoke of powder. The first pressure level P2 may be around $10^{-2}$ to $10^{-3}$ mbar. The gas provided in the reservoir is let into the vacuum chamber and relatively quickly the pressure in the vacuum chamber is increased to the first pressure level P2 indicated by the vertical line in said pressure time graph. As the vacuum pumps are continuously pumping out the contents from the vacuum chamber, the pressure will drop at a rate depending on the efficiency of said pumps, which is indicated by the sloped line from said first pressure level P2 to said second pressure level P1.

Since smoke of powder is most likely to be present in the beginning of the preheating when no powder is sintered at all said decrease of gas pressure will not affect the suppression of smoke of powder.

During the fusion step 63 the pressure in the additive manufacturing apparatus 21 may be kept as low as possible and in FIG. 3 it is kept at the second pressure level P1, which may be about $10^{-5}$ mbar or lower.

In an alternative embodiment the first pressure level P2 may be around $10^{-2}$ mbar and the second pressure level P1 may be $10^{-3}$ mbar or lower. In still another example embodiment the first pressure level P2 may be $2\times10^{-3}$ mbar and the second pressure level P1 may be $10^{-4}$ mbar. In yet another example embodiment said first pressure level P2 may be $2\times10^{-2}$ mbar and said second pressure level P1 may be $2\times10^{-5}$ mbar. The first pressure level P2 may be kept at a relatively high pressure in order to ensure a safe suppression of smoke of powder which is very material dependent given the same power of the electron beam. The second pressure level P1 may be kept at a relatively low pressure in order to keep the electron beam quality as good as possible, i.e., as little as possible blurred by interaction of the atoms during the path from a electron beam filament to the powder bed.

In the inventive method it is provided a reduction of the pressure in the vacuum chamber of said additive manufacturing apparatus from a first pressure level, here in FIG. 6, indicated by said first pressure level P2, to a second pressure level, here indicated by P1, between the step of providing said first powder layer and said second powder layer.

The preheating of the powder bed may, as in FIG. 6, be performed at least partially with decreasing pressure level, from a high pressure, the first pressure level P2, to a low pressure level, which may be the second pressure level P1. Said powder bed may be fused in said selected locations at least partially with said second pressure level P1.

When the fusion step 63 is finalized the powder and fused powder may need some heating in order to be within a predetermined temperature interval. This heating step is denoted in FIG. 6 by 64. In the embodiment depicted in FIG. 6, said heating step may at least partially be performed under said second pressure level P1. After said optional heating step it starts all over again, i.e., a next layer of powder is applied on top of the previous layer of powder and after that preheating, fusing and heating. This means that the pressure in the vacuum chamber is decreased from a first value to a second value between providing a first and second layer of powder material to be fused. The pressure in the vacuum chamber goes up and down depending on the process step. Preheating is performed at a higher pressure compared to the fusion step. After fusion is completed the pressure in the vacuum chamber is increased again in order to suppress particle smoke during preheating of the next layer.

A first supplementary gas provided into the vacuum chamber may be capable of providing ions when irradiated by the electron beam during said preheating. Said first supplementary gas may be at least one inert gas. Said inert gas is one or more in the group of: Helium, Argon, Carbon dioxide, Nitrogen, Neon, Krypton, Xenon, Radon.

Said first pressure level P2 may be about $10^{-3}$ mbar. The first pressure level may be changed depending on the type of first supplementary gas chosen, a lighter atom may need a somewhat higher pressure than a heavier atom chosen among the supplementary gases given above.

A second supplementary gas may be provided into the vacuum chamber of said additive manufacturing device 21. Said second supplementary gas may be capable of, at least when having been exposed to the electron beam, reacting chemically and/or physically with the powder layer on the work table.

The first and second supplementary gases may be present at the same time in the vacuum chamber.

The second supplementary gas may be provided to the vacuum chamber of said additive manufacturing apparatus 21 during the fusion step. The second supplementary gas may be let into the vacuum chamber at the end of the preheating step in order to ensure a constant and sufficient amount of second supplementary gas throughout the fusion step. This is to ensure that all powder layers will be melted by the same amount of second supplementary gas which in turn will ensure the same material property throughout the three-dimensional article to be produced.

The second supplementary gas may be one or more gases selected from the group of: Hydrogen, deuterium, hydrocarbons, gaseous organic compounds, ammonia, nitrogen, oxygen, carbon monoxide, carbon dioxide, nitrogen oxides and/or nitrous oxide.

The second pressure level P1, P3 may be about $10^{-5}$ mbar. A heavier gas atom may need a somewhat lower pressure than a lighter atom. This has to do with the fact that a heavier atom may scatter the electron beam more than a light gas atom and therefore less heavier atoms is needed in order to reach the same resolution of the electron beam as compared to the lighter gas atoms.

The powder provided on the work table may be made of metal.

A mean pressure level during the preheating may be higher than a mean pressure level during the fusion of the selected locations. The reason of having a higher pressure level of said at least first supplementary gas is to reduce or eliminate the likelihood of powder smoke. A certain number of ions are needed in the vacuum chamber in order to neutralize or decreasing the amount of the charges in the powder created by the ion beam when hitting said powder. For this reason there have to be a certain gas pressure in the vacuum chamber either by letting in said first supplementary gas as disclosed above or by providing an ion generator to said vacuum chamber which ions are let in to the vacuum chamber during said preheating step.

For one or a plurality of powder layers the preheating of powder layer N may be performed at a first pressure level and the fusion of powder layer N may be performed at a second pressure level, where said first pressure level may be higher than said second pressure level, where N may be any integer $\geq 1$.

During the fusion one wants to keep the pressure level of the gases in the vacuum chamber at a minimum since the gas atoms may more or less influence the resolution of the electron beam. Depending on the type of ions present in the vacuum chamber there may be some differences in the pressure allowed for maintaining the same electron beam resolution for reasons as explained above.

In another aspect of the present invention it is provided an apparatus for forming a three-dimensional article through successive fusion of parts of a powder bed, which parts corresponds to successive cross sections of the three-dimensional article. Said apparatus comprising: a vacuum chamber, an electron gun, a powder distributor for providing a first powder layer on a work table inside said vacuum chamber, a control unit for controlling an electron beam path over said work table causing said first powder layer to fuse in selected locations to form a first cross section of said three-dimensional article, wherein said control unit is configured to reduce the pressure in the vacuum chamber from a first pressure level, which is used during at least a part of a preheating of the powder layer, to a second pressure level, which is used during at least a part of the fusion of the powder layer.

The electron beam path may be controlled by means of one or a plurality of deflection coils arranged in the electron beam gun which is well known to a skilled person in the art. The control unit may control the deflection coil(s) according to the pattern (selected locations) which is to be fused on said powder layer.

Preheating may be used for heating the powder layer to a predetermined temperature and the pressure in the vacuum chamber may be higher during preheating compared to when the fusion of the powder is taking place. The control unit may control the vacuum pump(s) and one or a plurality of gas supply valves. A supplementary gas may be let into the vacuum chamber during preheating. Said supplementary gas may for instance be a gas which is capable of providing ions when irradiated by the electron beam during said preheating. Said supplementary gas may be Helium, Argon, Carbon dioxide, Nitrogen, Neon, Krypton, Xenon, Radon.

The control unit may change the pressure in the vacuum chamber from said first pressure level during preheating, to a second pressure level during fusion. The second pressure level has a lower pressure than the first pressure level. Fusion may take place with as little as possible disturbance of the electron beam by the molecules present in the vacuum chamber. For one or a plurality of powder layers the preheating of powder layer N may be performed at a first pressure level and the fusion of powder layer N may be performed at a second pressure level, where said first pressure level may be higher than said second pressure level, where N may be any integer$\geq 1$.

The invention is not limited to the above-described embodiments and many modifications are possible within the scope of the following claims. Such modifications may, for example, involve using a different source of energy beam than the exemplified electron beam such as laser beam. Other materials than metallic powder may be used such as powder of polymers or powder of ceramics.

The invention claimed is:

1. A method for increasing the resolution when forming a three-dimensional article through successive fusion of parts of a powder bed, which parts corresponds to successive cross sections of the three-dimensional article, said method comprising the steps of:
providing a vacuum chamber, an electron gun, and a first powder layer on a work table inside said vacuum chamber;
directing an electron beam from said electron gun over said work table causing said first powder layer to fuse in selected locations to form a first cross section of said three-dimensional article;
providing a second powder layer on said work table;
directing the electron beam over said work table causing said second powder layer to fuse in selected locations to form a second cross section of said three-dimensional article, wherein said second layer is bonded to said first layer; and
reducing the pressure in the vacuum chamber from a first pressure level to a second pressure level between the providing of said first powder layer and said second powder layer, preheating the powder bed at least partially with said first pressure level, wherein a mean pressure level during the preheating is higher than a mean pressure level during the fusion of the selected locations.

2. The method according to claim 1, wherein said powder bed is fused in said selected locations at least partially with said second pressure level.

3. The method according to claim 1, further comprising the step of providing a first supplementary gas into the vacuum chamber, which first supplementary gas is capable of providing ions when irradiated by the electron beam during said preheating.

4. The method according to claim 1, wherein said first supplementary gas is at least one inert gas.

5. The method according to claim 4, wherein said inert gas is one or more gases selected from the group consisting of: Helium, Argon, Carbon dioxide, Nitrogen, Neon, Krypton, Xenon, and Radon.

6. The method according to claim 1, wherein said first pressure level is about $10^{-3}$ mbar.

7. The method according to claim 1, further comprising the step of providing a second supplementary gas into the vacuum chamber, which second supplementary gas is capable of, at least when having been exposed to the electron beam, reacting chemically and/or physically with the powder layer on the work table.

8. The method according to claim 7, wherein said second supplementary gas is one or more gases selected from the group consisting of: Hydrogen, deuterium, hydrocarbons, gaseous organic compounds, ammonia, nitrogen, oxygen, carbon monoxide, carbon dioxide, nitrogen oxide, and nitrous oxide.

9. The method according to claim 1, wherein said second pressure level is about $10^{-5}$ mbar or lower.

10. The method according to claim 1, wherein the powder provided on the work table is made of metal.

11. The method according to claim 7, wherein said second supplementary gas is provided during the fusion of said selected locations.

12. The method according to claim 7, wherein said second supplementary gas is inserted when the pressure level in the vacuum chamber is below a predetermined level.

* * * * *